Jan. 24, 1950     J. J. DIGBY     2,495,653

ENGINE STARTER DRIVE

Filed May 24, 1948

WITNESS:
Esther M. Stockton.

INVENTOR.
James J. Digby
BY
Clinton S. James.
ATTORNEY

Patented Jan. 24, 1950

2,495,653

UNITED STATES PATENT OFFICE 2,495,653

ENGINE STARTER DRIVE

James J. Digby, Elmira, N. Y., assignor to Bendix Aviation Corporation, Elmira Heights, N. Y., a corporation of Delaware Application May 24, 1948, Serial No. 28,909

5 Claims. (Cl. 74—7)

1

The present invention relates to an engine starter drive and more particularly to an anti-kickout form of drive having an improved overload release and mesh-enforcing means.

In starter drives of the type in which a pinion is traversed into mesh with an engine gear by the initial acceleration of the starting motor, the accelerations and decelerations of the parts, both longitudinal and rotary, are so rapid that the mass and inertia of the parts are very important in affecting the meshing operation, and in particular the shock loads to which the parts are subjected. The provisions for permitting slipping or yielding in case of tooth abutment and/or overloading of the drive should, therefore, be located as closely as possible to the drive pinion in order to reduce the inertia of the parts between the point of application of the load to the drive, and the point of yield for relieving such load.

It is an object of the present invention to provide an engine starter drive having novel cushioning and load-limiting means located close to the drive pinion.

It is another object to provide such a device including a dental clutch which is arranged to slip on overload and which is yieldingly compressed by an elastic member in the form of a block of elastically deformable material which is subjected to compression only.

It is another object to provide such a device incorporating a dental overrunning clutch between the slip clutch and the starter drive pinion.

It is another object to provide such a device incorporating a splined connection between the overrunning clutch and the pinion, and a mesh enforcing spring normally holding the pinion in fully extended position.

It is a further object to provide such a device embodying a drive connection from the starting motor to the engine gear which is positive and without slippage until a predetermined maximum torque is exceeded, after which, slippage is allowed to take place while transmitting said maximum torque.

Figure 1:
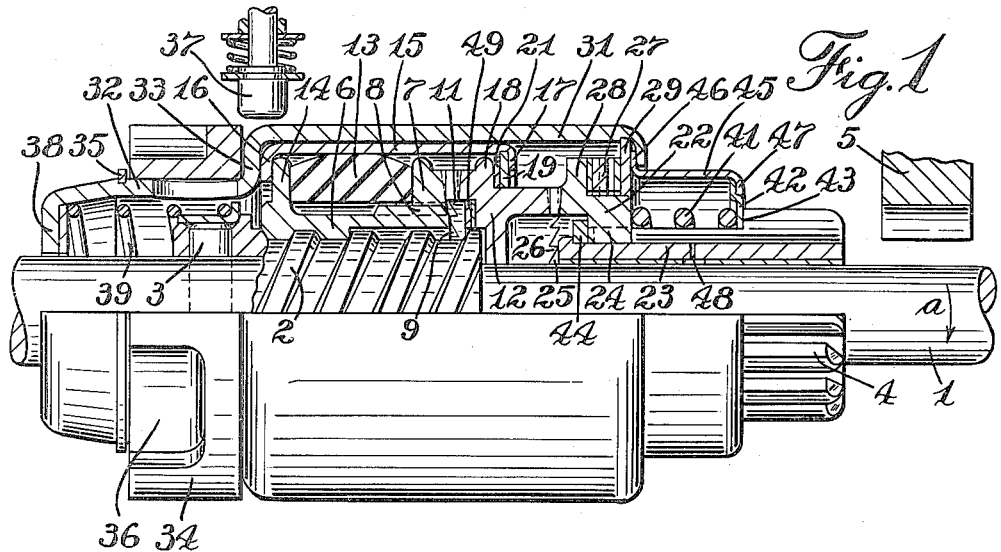
Figure 2:
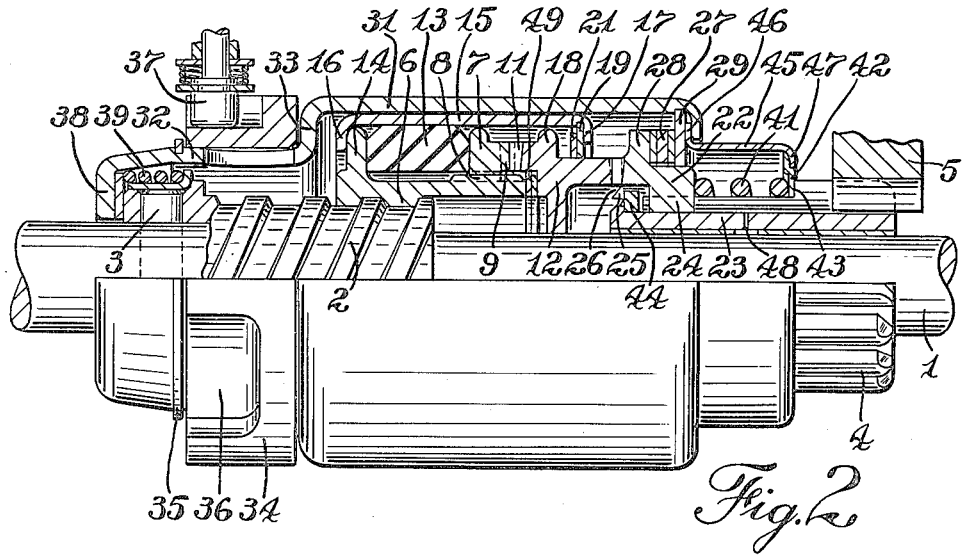

Further objects and advantages will be apparent from the following description taken in connection with the accompanying drawing in which:

Fig. 1 is a side elevation partly broken away and in section of a starter drive forming a preferred embodiment of the invention; and Fig. 2 is a similar view showing the parts in the positions assumed while the engine is being cranked.

2

In Fig. 1 of the drawing there is illustrated a power shaft 1 which is commonly the extended armature shaft of a starting motor not illustrated. A screw shaft 2 is fixed on the power shaft by suitable means such as a cross pin 3, and a pinion 4 is slidably journalled on the power shaft for longitudinal movement into and out of mesh with an engine gear 5.

Means for actuating the pinion from the screw shaft is provided comprising a control nut 6 threaded on the screw shaft, and a driving slip or overload clutch member 7 splined on the nut 6 as indicated at 8 and having inclined teeth 9 adapted to cooperate with similar teeth 11 formed on a driven slip clutch member 12 which is slidably journalled on the power shaft 1. A cylindrical block 13 of elastically deformable material such as rubber is mounted on the control nut 6 between a radial flange 14 thereof and the driving slip clutch member 7.

A sleeve 15 is arranged to surround the control nut, rubber block 13, and slip clutch members 7 and 12, and is provided with terminal flanges 16 and 17 bearing on the exterior of the flange 14 of the control nut and a flange 18 of the driven slip clutch member 12. Sleeve 15 holds said members under only enough initial compression to hold the overload clutch engaged until the control nut can further compress the rubber after the pinion engages with the ring gear and torque transmission begins to take place. Thrust rings 19 and 21 are preferably interposed between the flange 17 of sleeve 15 and the flange 18 of the driven slip clutch member 12, in order to form a thrust bearing at that point.

An overrunning clutch connection between the driven slip clutch member 12 and the pinion 4 is provided comprising a driven overrunning clutch member 22 splined on the hub 23 of the pinion 4 as indicated at 24, and having clutch teeth 25 adapted to cooperate with similar clutch teeth 26 formed on the driven slip clutch member 12. The overrunning clutch teeth 25, 26 are normally held in engagement by a spring 27 located between a flange 28 on the driven overrunning clutch member 22, and a thrust ring 29 fixedly mounted in a barrel member 31 which surrounds and encloses the drive.

Barrel 31 has a reduced portion 32 forming a shoulder 33 adapted to bear against the flange 16 of sleeve 15, and a latch ring 34 is journalled on the reduced portion against said shoulder, being retained thereon by a lock ring 35. The latch ring 34 is provided with pockets 36 adapted to cooperate with a latch plunger 37 which is preferably actuated by the starting switch, not illustrated, in the manner disclosed in the patent to Oliver, No. 2,444,109, issued June 29, 1948.

The barrel 31 terminates in a flange 38 arranged to cooperate with the end of the screw shaft 2 to provide an abutment for limiting the longitudinal travel of the movable parts of the drive toward meshing position. An anti-drift spring 39 is arranged to normally maintain the barrel 31 in idle position.

A compression spring 41 is mounted on the hub of the pinion 4 and bears at its ends against the driven overrunning clutch member 22 and a thrust ring 42 seated against a shoulder 43 of the pinion so as to normally maintain the pinion in extended position as defined by a thrust ring 44 seated in a groove in the end of the pinion hub. A sleeve 45 is arranged to surround and enclose the spring 41 to exclude dust from the splined connection and to retain lubricant therein. The sleeve 45 is provided with a flange 46 clamped to the end of the barrel 31 against the thrust ring 29 and with an inturned flange 47 surrounding the thrust ring 42 on the pinion. A lubricant channel 48 is preferably provided through the hub of the pinion so as to permit the space within the sleeve 45 to be used as a lubricant reservoir.

In the operation of the drive, starting with the parts in positions illustrated in Fig. 1, rotation of the power shaft 1 in the direction of the arrow (a) causes the control nut and its associated parts to be traversed to the right until the pinion 4 is meshed with the ring gear 5 of the engine and its further motion is arrested by the abutment of the flange 38 of the barrel against the end of the screw shaft 2. Torque is then transmitted through the overload slip clutch 7, 12 and the overrunning clutch 12, 22 to the pinion to rotate the engine gear. This torque causes a longitudinal thrust to be developed by the screw-jack action of the nut and screw shaft, which tends to compress further the rubber block 13, such compression being permitted by the splined connection 8 between the driving overload clutch member 7 and the nut 6. The longitudinal movement of the nut 6 to so compress the rubber block 13 is limited by its abutment against a thrust bearing provided by the driven overload clutch member 12. In order to regulate the compression of the rubber block, one or more thrust washers 49 are interposed between the end of the control nut and the driven overload clutch member 12.

The slope of the teeth 9, 11 on the overload clutch members 7 and 12 is made approximately equal to the helix angle of the triple threads so that the clutch will not open before the control nut moves forward to its terminal position against the thrust washers at the end of the control nut.

It is important to keep the initial compression of the rubber as low as possible in order to assist the mesh-enforcing spring 41 to provide a soft endwise cushion when the pinion strikes the ring gear. The amount of torque that the drive overload clutch will transmit is regulated by the travel of the control nut in further compressing the rubber. The travel is adjusted by adding or removing thrust washers 49 at the end of the control nut. If the predetermined maximum torque is exceeded momentarily by shock loads applied to the drive during the meshing operation or at any other time, the longitudinal thrust of the slip clutch teeth becomes large enough to still further compress the rubber block 13 sufficiently to allow the clutch teeth to ratchet over each other, thus slipping off the excessive torque loads.

When the engine fires, the acceleration of the pinion 4 causes it to overrun the drive, this being permitted by the overrunning clutch connection 12, 22. As long as the starting switch is held closed, the plunger 37 enters and remains in a pocket 36 of the latch ring 34 as shown in Fig. 2, whereby demeshing of the pinion 4 from the ring gear 5 is prevented. When the starting switch is opened, the plunger 37 is withdrawn so as to permit the parts to be returned to their idle positions by the acceleration transmitted from the engine gear through the pinion.

If during the meshing operation a tooth of the pinion should abut against a tooth of the ring gear 5, the splined connection between the pinion and the driven overrunning clutch member 22 permits the longitudinal travel of the control nut and its associated parts to continue after the movement of the pinion is thus arrested so as to build up sufficient torque to index the teeth of the pinion into proper registry with the tooth spaces of the ring gear, while compressing the mesh-enforcing spring 41. When such registry is secured, the spring 41 snaps the pinion into mesh so as to avoid the possibility of milling action of the pinion teeth on the ring gear.

It will be noted that the yielding mesh-enforcing connection for the pinion, and the yielding slip connection for relieving excess torque loads are both located as close as possible to the pinion. The inertia of the parts involved in the yielding and mesh-enforcing functions is consequently very small so that these functions are performed quickly and with a minimum of shock. Without the spring 41 the heavy drive would quickly damage the ring gear teeth but with the spring, ring gear life is better than would be the case with a lighter meshing mass without a mesh-enforcing spring. The heavy meshing mass of this drive is an advantage in that it improves cold weather meshing.

Although but one embodiment of the invention has been shown and described in detail, it will be understood that other embodiments are possible and that various changes may be made in the design and arrangement of the parts without departing from the spirit of the invention.

I claim:

1. In an engine starter drive a power shaft, a screw shaft fixed thereon, a pinion journalled on the power shaft for longitudinal movement into and out of mesh with a gear of an engine to be started, a nut on the screw shaft, a driving slip clutch member having inclined torque-transmitting teeth splined on the nut, a driven slip clutch member having cooperating inclined teeth journalled on the power shaft, an elastic compression member on the nut engaging the driving clutch member, a sleeve engaging at its ends the nut and driven clutch member and holding the clutch members and elastic member under compression, means connecting the driven clutch member to the pinion including a transmission member splined on the pinion, yielding mesh enforcing means urging the pinion into extended relation with respect to the transmission member, and means for retaining the transmission member on the pinion.

2. An engine starter drive as set forth in claim 1 in which the driven slip clutch member and the transmission member are provided with cooperating overrunning clutch teeth, and including further yielding means for causing engagement of said overrunning clutch teeth.

3. An engine starter drive as set forth in claim 1 including further telescopic means for enclosing the splined connection and mesh-enforcing means.

4. An engine starter drive as set forth in claim 2 including further a barrel member enclosing the driving connection from the screw shaft to the pinion and having means for maintaining the yielding overrunning clutch means under compression and for limiting the meshing movement of the pinion.

5. An engine starter drive as set forth in claim 2 including further a barrel member enclosing the driving connection from the screw shaft to the pinion and having abutments for maintaining the yielding overrunning clutch means under compression and for limiting the longitudinal travel of the clutch members toward the engine member, the pitch of the threads of the screw shaft being substantially the same as the slope of the teeth of the slip clutch.

JAMES J. DIGBY.

No references cited.